(12) United States Patent
Evans, Jr. et al.

(10) Patent No.: US 11,274,767 B2
(45) Date of Patent: Mar. 15, 2022

(54) FLOW RATE SCALE FIELD CALIBRATION FOR BALANCING VALVE

(71) Applicant: FLUID HANDLING LLC, Morton Grove, IL (US)

(72) Inventors: Stanley Paul Evans, Jr., Tinley Park, IL (US); Florin Rosca, Niles, IL (US); Glenn Edward Huse, Green Oaks, IL (US); Donald Arthur Kahn, Niles, IL (US)

(73) Assignee: FLUID HANDLING LLC, Morton Grove, IL (US)

( * ) Notice: Subject to any disclaimer, the term of this patent is extended or adjusted under 35 U.S.C. 154(b) by 0 days.

(21) Appl. No.: 17/245,577

(22) Filed: Apr. 30, 2021

(65) Prior Publication Data

US 2021/0324967 A1    Oct. 21, 2021

Related U.S. Application Data

(63) Continuation of application No. 13/668,633, filed on Nov. 5, 2012, now abandoned.

(Continued)

(51) Int. Cl.
*F16K 37/00*  (2006.01)
*G05D 7/01*  (2006.01)

(52) U.S. Cl.
CPC ........... *F16K 37/0016* (2013.01); *G05D 7/01* (2013.01); *Y10T 137/8225* (2015.04); *Y10T 137/8309* (2015.04)

(58) Field of Classification Search
CPC ...... F16K 37/0016; F16K 5/10; F16K 27/067; F16K 43/003; Y10T 137/8225;
(Continued)

(56) References Cited

U.S. PATENT DOCUMENTS 2,951,501 A    9/1960  Thylefors
3,460,800 A    8/1969  Mikuls
(Continued)

FOREIGN PATENT DOCUMENTS

CN    1575392 A    2/2005
CN    1690487 A    11/2005
(Continued)

OTHER PUBLICATIONS

English language Abstract of CN 202432054U.
(Continued)

*Primary Examiner* — Kelsey E Cary
(74) *Attorney, Agent, or Firm* — Ware, Fressola, Maguire & Barber LLP

(57) ABSTRACT

A balance or flow limiting valve features a valve body/member having a flow rate indicator/scale containing setting having printed flow rates calibrated in units of measure in volume per time increment between a minimum flow rate position (MIN) and a maximum flow rate position (MAX); and a knob/handle having a position indicator and being moveable to any continuous position on the flow rate indicator/scale between MIN and MAX in response to a user applied force, where the relationship between the flow rate indicator/scale and the position indicator is based on calibrated flow characteristics of the balance or flow limiting valve. The user can set an exact desired flow rate in one operation by moving the knob/handle to a desired position between MIN and MAX without consulting a printed flow curve or balance calculator to determine the desired exact flow rate.

10 Claims, 6 Drawing Sheets

Related U.S. Application Data

(60) Provisional application No. 61/586,372, filed on Jan. 13, 2012.

(58) Field of Classification Search
CPC ......... Y10T 137/8309; Y10T 137/8292; Y10T 137/8326; Y10T 137/8342; Y10T 137/8359; G05D 7/01
See application file for complete search history.

(56) References Cited

U.S. PATENT DOCUMENTS

| | | | |
|---|---|---|---|
| 3,658,450 | A | 4/1972 | Woodling |
| 4,364,409 | A | 12/1982 | Jones |
| 4,741,361 | A * | 5/1988 | McHugh ................ A62C 37/50 137/271 |
| 4,901,978 | A | 2/1990 | Feild |
| 4,989,829 | A | 2/1991 | Bickel |
| 5,230,366 | A | 7/1993 | Marandi |
| 5,301,713 | A | 4/1994 | Skoglund |
| 5,393,035 | A | 2/1995 | Steele |
| 5,400,819 | A | 3/1995 | Lemmens |
| 6,343,619 | B1 | 2/2002 | Pruitt |
| 6,540,205 | B1 | 4/2003 | Stafford |
| 6,725,880 | B1 | 4/2004 | Liu |
| 7,337,795 | B2 | 3/2008 | Johnson et al. |
| 7,861,741 | B2 | 1/2011 | Kress |
| 8,763,632 | B2 | 7/2014 | Loeffler |
| 2005/0127317 | A1 | 6/2005 | Rebello |
| 2006/0243330 | A1 | 11/2006 | Abanto |
| 2007/0012367 | A1 | 1/2007 | Hotz et al. |
| 2007/0074769 | A1 | 4/2007 | Moesby |
| 2010/0170581 | A1 | 7/2010 | Loeffler |
| 2010/0307219 | A1 | 12/2010 | Fackler et al. |
| 2011/0023576 | A1 | 2/2011 | Mountz et al. |
| 2019/0032801 | A1 * | 1/2019 | Andersson ................ F16K 1/12 |

FOREIGN PATENT DOCUMENTS

| | | |
|---|---|---|
| CN | 101225882 | 7/2008 |
| CN | 101354096 A | 1/2009 |
| CN | 201225447 Y | 4/2009 |
| CN | 1016899054 A | 3/2010 |
| CN | 201706030 U | 1/2011 |
| CN | 201802969 | 4/2011 |
| CN | 202432054 U | 9/2012 |
| DE | 4407689 A1 | 8/1994 |
| DE | 4416154 A1 | 11/1995 |
| DE | 19940471 | 3/2001 |
| DE | 19940471 A1 | 10/2015 |
| FR | 2218524 | 9/1974 |
| WO | 8805159 | 7/1988 |
| WO | 02086365 | 10/2002 |
| WO | 2011045639 | 4/2011 |
| WO | 2011045639 A2 | 10/2015 |

OTHER PUBLICATIONS

English language Abstract of CN 201706030U.
English language Abstract of CN 1575392A.
English language Abstract of CN 1690487A.
English language Abstract of CN 101354096A.
"Frese OPTIMA Compact—Pressure independent balancing & control valve", UK Frese OPTIMA Compact, Mar. 2011, 11 pages.
B&G's Model Published on Jan. 25, 2009—Prior Art.
English Abstract of DE19940471.
English Abstract of DE 4407689.
English Abstract of DE 4416154.
English language Abstract of CN101689054.
English language Abstract of CN201225447.
English Abstract of CN 201802969.
English Abstract of CN 101225882.
English language Abstract of DE 19940471.

* cited by examiner

FLOW RATE SCALE FIELD CALIBRATION FOR BALANCING VALVE

CROSS-REFERENCE TO RELATED APPLICATION

This application is a continuation of U.S. patent application Ser. No. 13/668,633 filed on 5 Nov. 2012, which application claims benefit to U.S. provisional patent application Ser. No. 61/586,372, filed 13 Jan. 2012, which is hereby incorporated by reference in its entirety.

BACKGROUND OF THE INVENTION

1. Field of the Invention

The present invention relates to a balancing valve; and more particularly to a new technique for providing a flow rate scale field calibration for such a balancing valve.

2. Brief Description of Related Art

Presently, flow setting with balance or flow limiting valves in a hydronic system requires the user to first set the valve position by turning a knob or handle on the valve to a position indicated on an adjacent scale. Current valve scales have either an arbitrary numbering scheme, or a number relating to the percentage of maximum rated flow of the specific valve. The user then must consult either a printed flow curve or other form of a balance calculator to determine the valve's flow rate, and make further adjustments if necessary. For complicated systems, this could add a significant amount of time for system balancing.

For example, FIG. 1 shows a flow rate scale or indicator that forms part of a balancing valve that is known in the art. In FIG. 1, the flow rate scale or indicator has 15 hash marks, including 8 numerically written increments and hash marks for settings 0.5, 1.0, 1.5, 2, 2.5, 3, 3.5, 4.0, as well as 7 intermediate hash marks alone for settings 0.75, 1.25 1.75, 2.25, 2.75, 3.25, 3.75. The 8 numerically written increments and hash marks for settings 0.5, 1.0, 1.5, 2, 2.5, 3, 3.5, 4.0 correspond to flow rates that are calibrated in tenths of a gallon per minute (GPM), while the 7 intermediate hash marks alone for settings 0.75, 1.25 1.75, 2.25, 2.75, 3.25, 3.75 correspond to flow rates in GPM that are calibrated in hundredths of a GPM. The known balancing valve has no intermediate hash marks that have been calibrated in tenths of a GPM, but instead has intermediate hash marks calibrated in hundredths of a GPM. Because of this, the known balancing valve makes it harder to visually interpolate between the hash marks in tenths of a GPM. In fact, a user must try to visually interpolate every intermediate setting in tenths of a GPM, which makes it harder to visually interpolate between the 8 numerically written increments and hash marks. For example, the user cannot easily interpolate between the hash marks for settings 2.0 and 2.5 and arrive at a setting for setting 2.3, because the user must try to move the position indicator about 60% of the way between the hash marks for settings 2.0 and 2.5, or to move the position indicator about 20% of the way between the hash marks for settings 2.25 and 2.5. In effect, the known balancing valve provides no hash marks for standard calibrations in tenths of a GPM like 0.2, 0.4, 0.6, 0.8 that fall between numerically written increments and hash marks for settings 1.0 and 2.0; for settings 2.0 and 3.0; or for settings 3.0 and 4.0. Moreover, the known balancing valve requires the user to combine and consider both hash marks in the tenths of a GPM and hundreds of a GPM for standard calibrations like 0.2, 0.4, 0.6, 0.8 that fall between numerically written increments and hash marks for settings 1.0 and 2.0; for settings 2.0 and 3.0; or for settings 3.0 and 4.0. Both of these shortcomings lead to less flow accuracy when the user sets the flow rate of the known balancing valve.

Moreover, the following patent documents disclose other techniques that are also known in the art, including: U.S. patent publication no. 2007/0012367 discloses a field flow adjustment mechanism having a pointer and a scale, where the cooperation between the pointer and the scale is linked to an adjustment screw, not the manual crank arm. In the '367 publication, a flow setting assembly permits field adjustment of an electronically actuated flow control valve, particularly a pressure independent characterized control valve (PICCV). In a preferred form, flow can be field adjusted by using a hex tool, so that the flow can be increased or decreased within the valve's adjustable flow range.

U.S. Pat. No. 7,861,741 discloses a hydraulic flow control valve having a flow rate setting device with a flow rate setting indicator that includes discrete predetermined flow rate settings, each in gallons per minute, formed on an outer surface of a control, and/or a valve housing or body. In the '741 patent, the hydraulic flow control valve allows adjustment of fluid flow for a variety of hydraulic attachments. The hydraulic flow control valve includes a spool and a flow rate setting adjustment device configured to adjust a flow rate setting of the hydraulic flow control valve by adjusting the amount of travel allowed for the spool.

U.S. Pat. No. 6,343,619 discloses a two-part faucet gauge having a gauge strip with strip indicia and a gauge cover with cover indicia that is utilized to reduce the time and water wasted in adjusting water to a desired pressure and temperature.

SUMMARY OF THE INVENTION

This present invention provides for a feature to be added to the balance or flow limiting valve that shows an exact flow rate for a setting chosen in the appropriate unit of measure of flow rate, (such as GPM, L/H, or other) and allows a user to set a desired flow rate in one operation. Based on flow characteristics of a balance valve, a relationship can be determined between the rated flow and the position of the knob or handle. This relationship can be transcribed onto a scale to provide desired increments of flow settings. A position indicator on the knob or handle allows an exact desired flow rate to be set. The position of the scale in relation to the knob or handle will allow the flow through the valve to be adjusted as desired by the user in one simple operation.

According to some embodiments, the present invention may take the form of a balance or flow limiting valve featuring a valve body/member and a knob or handle.

The valve body/member may be configured with a flow rate indicator or scale containing settings each having a printed flow rate calibrated in appropriate units of measure in volume per time increment, including within a predetermined degree of exactitude between minimum and maximum flow rate positions, including e.g., a minimum flow rate position (MIN) and a maximum flow rate position (MAX).

The knob or handle may have a position indicator and may be configured to be moved to any continuous position on the flow rate indicator or scale between the minimum and maximum flow rate positions in response to force applied by a user, where the relationship between the flow rate indicator or scale of the valve member and the position indicator of the knob or handle is based at least on calibrated flow characteristics of the balance or flow limiting valve.

In operation, the user can set a substantially exact desired flow rate in one operation by moving the knob or handle to a desired position between the minimum and maximum flow rate positions without consulting a printed flow curve or other form of a balance calculator to determine the desired exact flow rate of the balance or flow limiting valve.

In particular, and by way of example only, printed flow rate settings on the flow rate indicator or scale may contain 25 hash marks, including 6 alphanumerically written increments and hash marks for settings MIN (0.97), 2.00, 3.00, 4.00, 5.00, MAX (5.85), as well as 19 intermediate hash marks alone for settings 1.2, 1.4, 1.6, 1.8, 2.2, 2.4, 2.6, 2.8, 3.2, 3.4, 3.6, 3.8, 4.2, 4.4, 4.6, 4.8, 5.2, 5.4, 5.6. The 4 numerically written increments and hash marks for settings 2.00, 3.00, 4.00, 5.00, as well as the 19 intermediate hash marks for settings 1.2, 1.4, 1.6, 1.8, 2.2, 2.4, 2.6, 2.8, 3.2, 3.4, 3.6, 3.8, 4.2, 4.4, 4.6, 4.8, 5.2, 5.4, 5.6, may all correspond to flow rates that are calibrated in tenths of a GPM. The MIN and MAX alphanumerically written increments and hash marks may correspond to flow rates that are calibrated in hundredths of a GPM, based on the theoretical operation of the balancing valve.

Furthermore, an by way of example only, in the balancing valve according to some embodiments of the present invention, 23 of 25 hash marks may correspond to flow rate settings that have been specifically calibrated in tenths of GPM, so as to provide substantially more known calibrations in tenths of a GPM. Because of this, the balancing valve according to the present invention makes it easier to visually interpolate between the hash marks in tenths. For example, the user can easily interpolate between the hash marks for settings 2.2 and 2.4 and arrive at a setting for 2.3 by moving the position indicator about ½ way (50%) between the hash marks for settings 2.2 and 2.4.

The present invention may also include one or more of the following additional features:

For example, the knob or handle may be configured to rotate in relation to the valve body/member. Alternatively, the knob or handle may be configured to slide, including sliding linearly or axially, in relation to the valve body/member.

The appropriate unit of measure may be gallons per minute (GPM) or liters per hour (LPH), although the present invention may be implemented using other appropriate units of measurement depending on the particular application.

The intermediate printed flow rate settings between the minimum and maximum flow rate positions may correspond to flow rates that are all calibrated to the same predetermined degree of exactitude, including about a tenth of a GPM, between a MIN printed flow rate setting and a MAX printed flow rate setting. Alternatively, the predetermined degree of exactitude may include a predetermined degree of calibration that is measured in about a hundredth of a GPM.

The same predetermined degree of exactitude may also, e.g., fall in a range of precisions, including a precision in a range of for example about a tenth to a thousandth of a GPM, depending on any particular application for any particular balancing valve.

The valve body/member may be configured so that flow is substantially linear and within about the same predetermined degree of exactitude when the knob or handle is moved to other settings between adjacent calibrated printed flow rate settings.

There are important differences and advantages between the balancing valve according to the present invention and the known balancing valve shown in FIG. 1. For example, one important difference and advantage includes an increased number of increments between the flow rates. Another important difference and advantage includes the addition of MIN and MAX indicators. The additional increments and indicators are important because they lead to greater flow accuracy, consistent with the reasons set forth herein. Further, the balancing valve according to the present invention has more hash marks that correspond to actual flow calibrations in tenths of a GPM, especially when compared to the balancing valve shown in FIG. 1, and makes it easier to visually interpolate between hash marks in tenths of a GPM. Furthermore, the balancing valve according to the present invention does not mix some actual flow calibrations between the MIN and MAX indicators measured in the tenths with other actual flow calibrations between the MIN and MAX indicators measured in the hundredth.

Moreover, there are important differences and advantages between the balancing valve according to the present invention and the known technique disclosed in aforementioned '741 prior art patent. For example, the present invention allows for fine continuous adjustment between the flow settings shown on the dial, as opposed to a limited number of discrete (non-continuous) increments that are critical to the technique disclosed in aforementioned '741 prior art patent.

BRIEF DESCRIPTION OF THE DRAWING

The drawing includes the following FIGS. 1 to 4, which are not necessarily drawn to scale:

FIG. 2b is an exploded view of parts or components of the balancing valve shown in FIG. 2a.

DETAILED DESCRIPTION OF THE INVENTION

Figure 1:
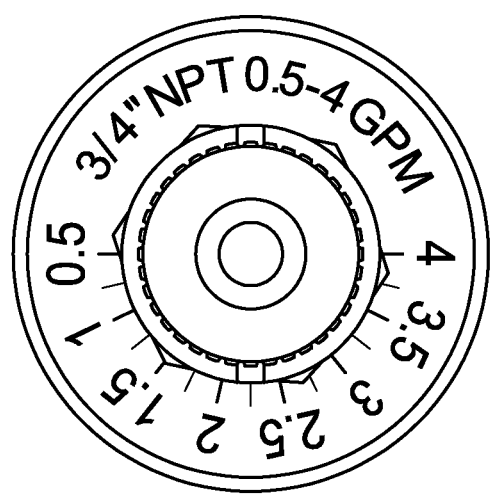
FIG. 1 shows a flow rate scale or indicator that forms part of a balancing valve that is known in the art.
Figure 2A:
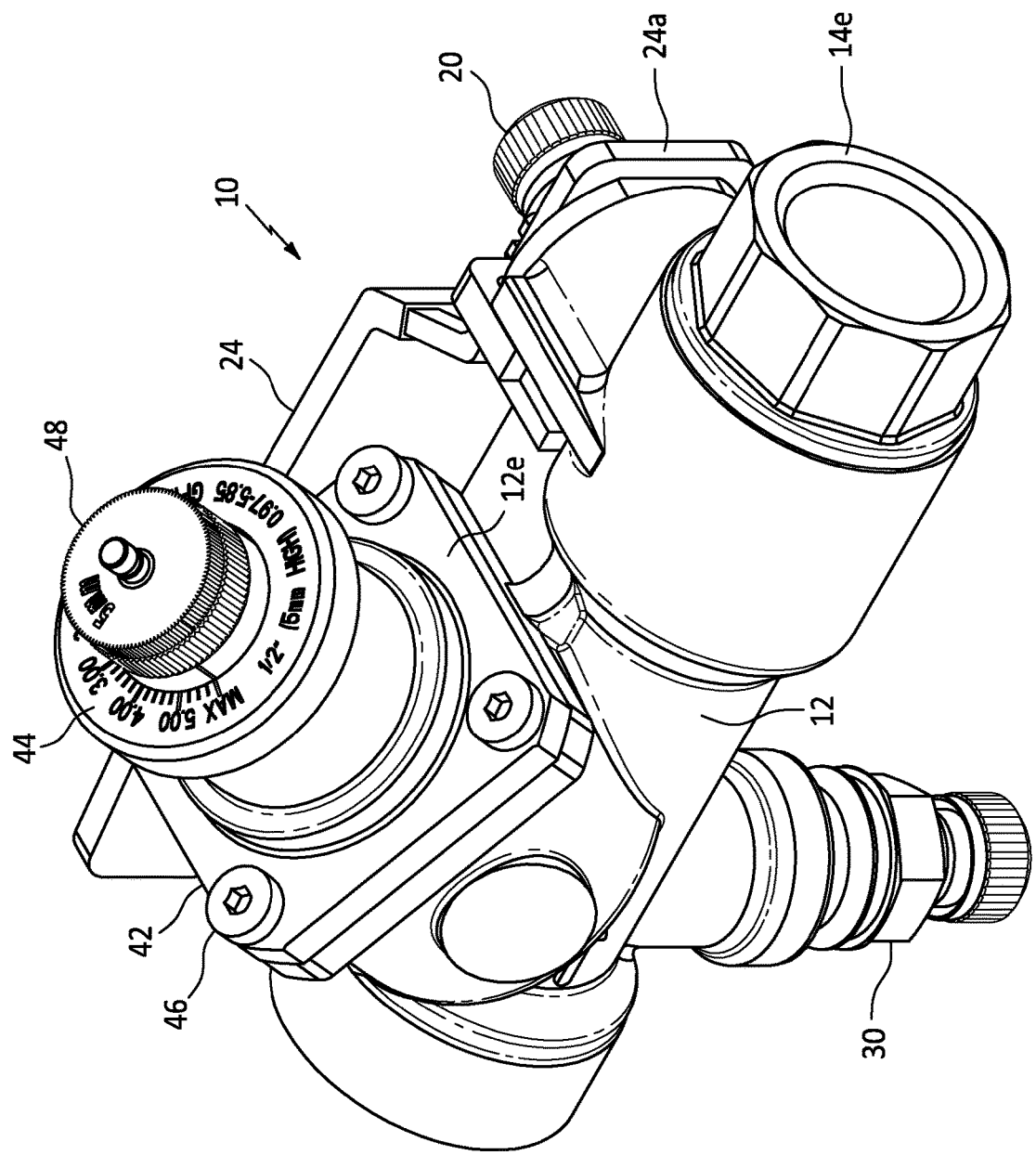
FIG. 2a is a top perspective view of apparatus in the form of part of a balancing valve having a flow rate scale field calibration, according to some embodiments of the present invention.
Figure 2B:
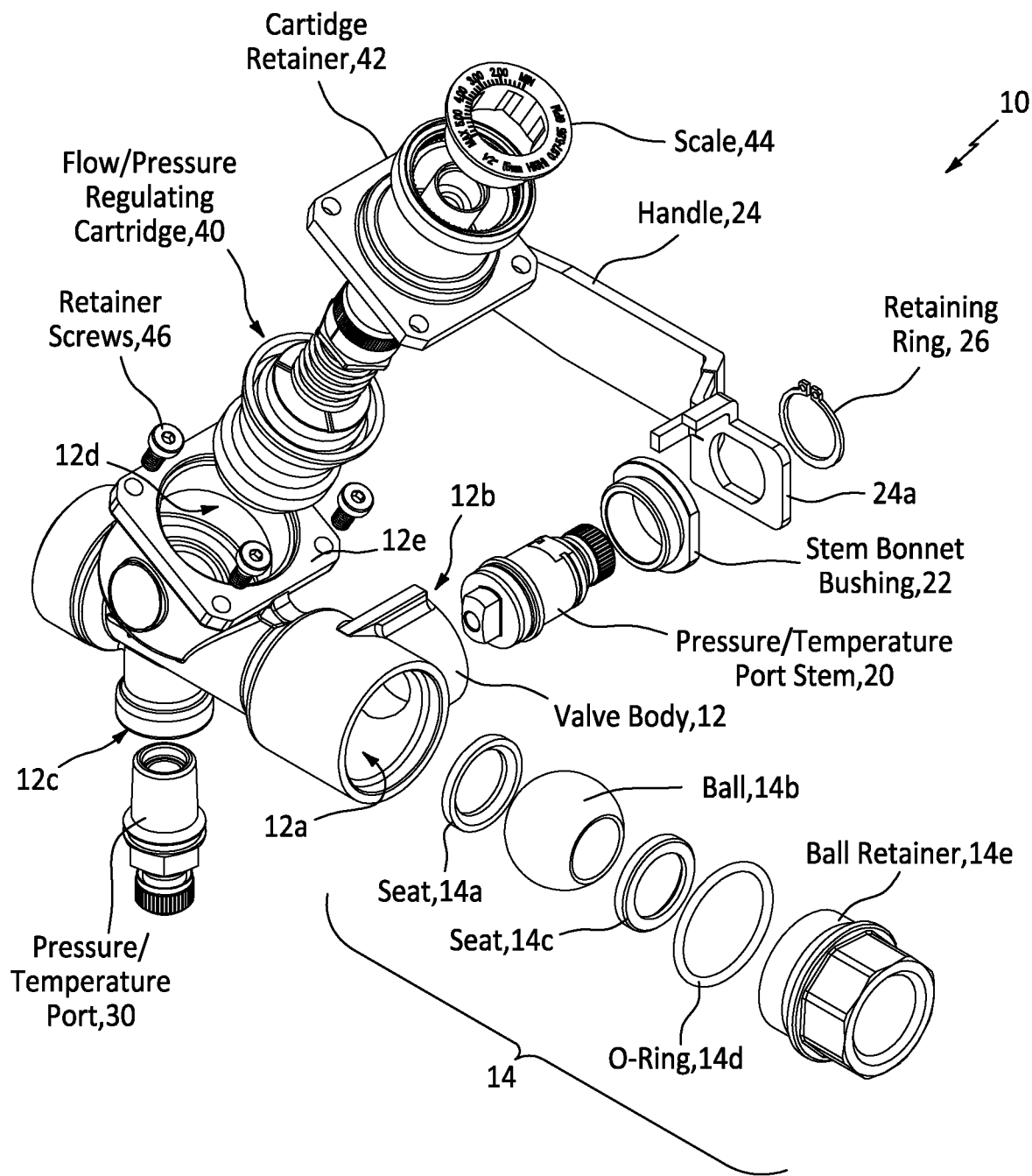
Figure 2C:
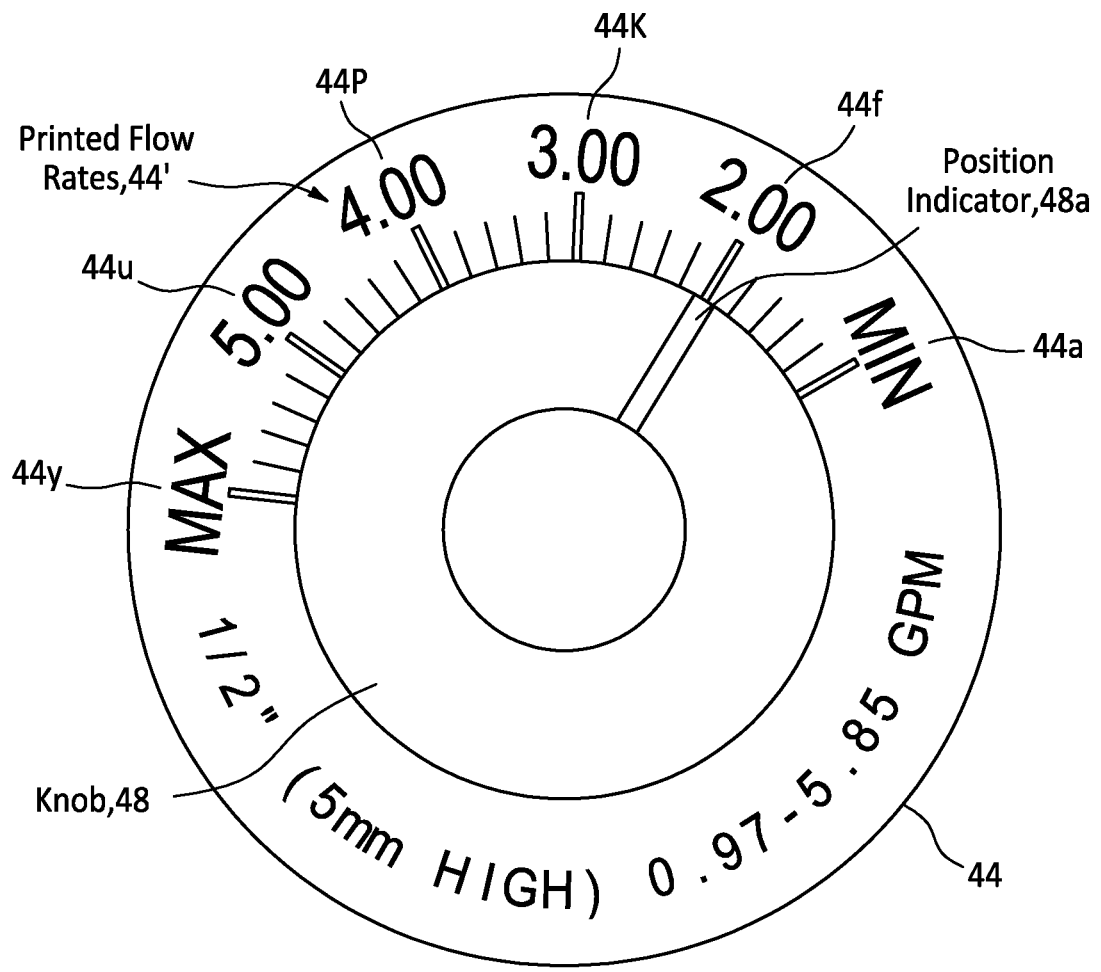
FIG. 2c is a plan view of a combination of a scale and a knob that forms part of the balancing valve shown in FIGS. 2a and 2b, according to some other embodiments of the present invention.

FIGS. 2a to 2c

FIG. 2a-2c show apparatus generally indicated as 10 in the form of part of a balancing valve having a flow rate scale field calibration implementation according to some embodiments of the present invention. FIGS. 2a and 2b shows the parts and components of the balancing valve 10, and FIG. 2c shows a scale or indicator and a knob that forms part of the balancing valve shown in FIGS. 2a and 2b.

In FIGS. 2a and 2b, the balancing valve 10 includes a valve body/member 12 configured or formed with a first cavity or chamber generally indicated as 12a to receive a combination or arrangement generally indicated as 14 of a seat 14a, a ball 14b, a seat 14c, an O-ring 14d and a ball retainer 14e. The valve body 12 is also formed with a second cavity or chamber generally indicated as 12b and coupled to the first cavity or chamber 12a. The second cavity or chamber 12b is configured to receive a combination of a pressure/temperature port stem 20 and a stem bonnet bushing 22. The balancing valve 10 includes an on/off handle 24 having a handle retaining portion 24a and also includes a retaining ring 26 configured to attach to the pressure/temperature port stem 20, so as to couple together the pressure/temperature port stem 20, the stem bonnet bushing 22 and the handle retaining portion 24a, so that the on/off handle 24 can turn the pressure/temperature port stem 20. The valve body 12 is also formed with a third cavity or chamber generally indicated as 12c configured to receive a pressure/temperature port 30. The valve body 12 is also formed with a fourth cavity or chamber generally indicated as 12d that is coupled to the third cavity or chamber 12c, and is also configured to receive a combination of a flow pressure regulating cartridge 40, a cartridge retainer 42 and a flow rate scale or indicator 44, according to some embodiments of the present invention. As shown, retainer screws 46 couples the cartridge retainer 42 to a flange portion 12e of the valve body 12. As best shown in FIG. 2a, the balancing valve 10 also includes a knob or handle 48 configured in relation to the flow rate scale or indicator 44 and the cartridge retainer 42 and coupled to the flow pressure regulating cartridge 40. In operation, the knob or handle 48 is configured to be rotated in relation to the flow rate scale or indicator 44 and is also configured to turn the flow pressure regulating cartridge 40 so as to determine the flow rate of the balancing valve 10.

As best shown in FIG. 2c, and by way of example, the flow rate indicator or scale 44 may be configured to contain printed flow rate settings, each setting having a respective printed flow rate and/or hash mark, one of which is indicated by reference label 44'. The printed flow rate settings may include, by way of example, 25 calibrated printed flow rate settings labeled 44a, . . . , 44f, . . . , 44k, . . . , 44p, . . . , 44u, . . . , 44y. To minimize clutter in FIG. 2c, some of the calibrated printed flow rate settings are indicated by reference numerals, while others are not. For example, the four (4) hash marks between reference labels 44a and 44f, 44f and 44k, 44k and 44p, and 44p and 44u are shown in FIG. 2c but not labeled, and the three (3) hash marks between reference labels 44u and 44y are also shown in FIG. 2c but not labeled. The scope of the invention is not intended to be limited to any particular number of calibrated printed flow rate settings; and embodiments are envisioned having more than 25 calibrated printed flow rate settings or less than 25 calibrated printed flow rate settings, depending on any particular application of any particular balancing valve. As shown, the 25 calibrated printed flow rate settings may include a combination of 25 hash marks and 6 alphanumerically indicated flow rate settings like MIN, 2.00, 3.00, 4.00, 5.00 and MAX. The printed numeric flow rate settings 44f, 44k, 44p, 44u are labeled in appropriate units of measure in a volume per time increment within a predetermined degree of exactitude between a minimum flow rate position (MIN) indicated as 44a and a maximum flow rate position (MAX) indicated as 44y. The knob or handle 48 is configured with a position indicator 48a and may be configured to be moved or rotate to any continuous position on the flow rate indicator or scale 44 between the minimum flow rate position (MIN) 44a and the maximum flow rate position (MAX) 44y in response to rotational force applied by a user to the knob or handle 48, where the relationship between the flow rate indicator or scale 44 of the valve body/member 12 and the position indicator 48a of the knob or handle 48 is based at least partly on calibrated flow characteristics of the balance or flow limiting valve 10. In operation, the user can set a substantially exact desired flow rate in one operation by moving or rotating the knob or handle 48 to a desired position between the minimum flow rate position (MIN) 44a and the maximum flow rate position (MAX) 44y without consulting a printed flow curve or other form of a balance calculator to determine the desired exact flow rate of the balance or flow limiting valve 10.

In FIG. 2c, the 25 calibrated printed flow rate settings are shown in the form of the 25 hash marks, including the 6 alphanumerically written increments and hash marks for settings MIN (0.97), 2.00, 3.00, 4.00, 5.00, MAX (5.85), as well as 19 intermediate hash marks for settings 1.2, 1.4, 1.6, 1.8, 2.2, 2.4, 2.6, 2.8, 3.2, 3.4, 3.6, 3.8, 4.2, 4.4, 4.6, 4.8, 5.2, 5.4, 5.6. The 4 numerically written increments and hash marks for settings 2.00, 3.00, 4.00, 5.00, as well as the 19 intermediate hash marks for settings 1.2, 1.4, 1.6, 1.8, 2.2, 2.4, 2.6, 2.8, 3.2, 3.4, 3.6, 3.8, 4.2, 4.4, 4.6, 4.8, 5.2, 5.4, 5.6, may all correspond to flow rates that are calibrated to a predetermined degree of exactitude measured, e.g., in tenths of a GPM. The MIN and MAX alphanumerically written increments and hash marks may correspond to flow rates that are calibrated to a predetermined degree of exactitude measured, e.g. in hundredths of a GPM, based on the theoretical operation of the balancing valve.

Furthermore, and by way of example, in the balancing valve 10, 23 of 25 hash marks may correspond to flow rates that have been specifically calibrated in tenths of GPM, so as to provide substantially more known calibrations in tenths of a GPM. Because of this, the balancing valve according to the present invention makes it easier to visually interpolate between the hash marks in tenths. For example, the user can easily interpolate between the hash marks for settings 2.2 and 2.4 and arrive at a setting for 2.3 by moving the position indicator about ½ way (50%) between the hash marks for settings 2.2 and 2.4.

The scope of the invention is not intended to be limited to any particular degree of exactitude, and may include other degrees of exactitude based at least partly on any particular application, including a hundredth of a GPM, a thousandth of a GPM, etc.

Embodiments are also envisioned in which the flow rate indicator or scale 44 may include other types or kinds of settings. including for example, printed flow rate settings ranging from 1 to 4, or 1 to 5, or 1 to 6, etc., e.g., measured in GPM or some other volumetric measurement per time. The scope of the invention is not intended to be limited to any particular type, kind, or number of printed flow rate settings on the printed flow rate indicator or scale 44.

FIG. 3

Figure 3:
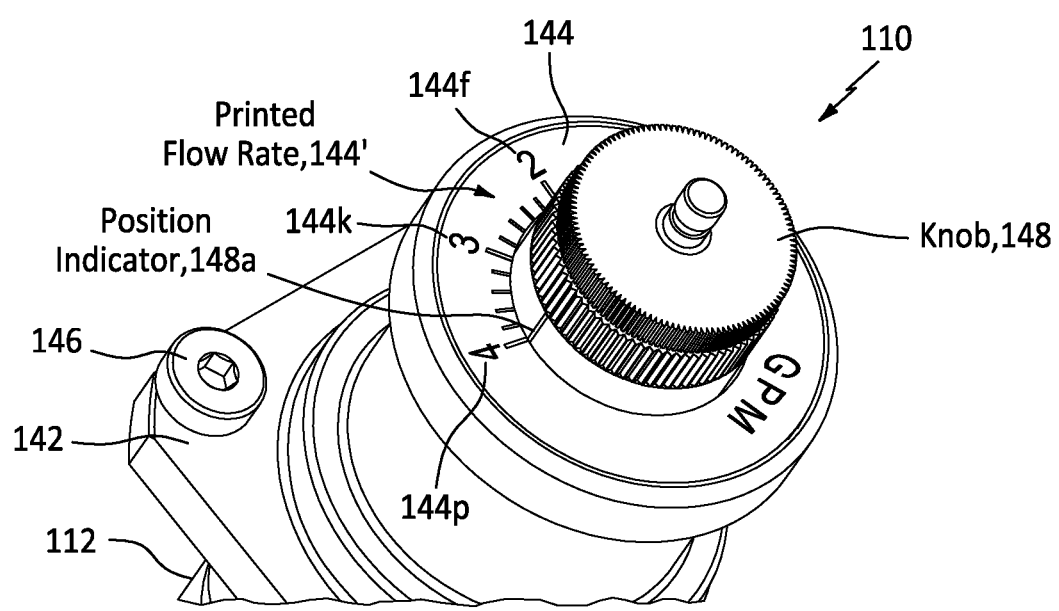
FIG. 3 shows apparatus in the form of part of a balancing valve having a flow rate scale field calibration, according to some other embodiments of the present invention.

FIG. 3 shows apparatus generally indicated as 110 that forms part of a balancing valve having a flow rate scale field calibration, according to some other embodiments of the present invention. In FIG. 3, corresponding parts or components to the parts or components shown in FIGS. 2a to 2c have corresponding reference labels plus 100.

In FIG. 3, the balancing valve 110 may include a valve body/member 112 arranged in relation to a knob or handle 148. The valve member 112 may be configured with a flow rate indicator or scale 144 containing settings, each having a respective printed flow rate 144' calibrated in appropriate units of measure in volume per time increment within a predetermined degree of exactitude, consistent with that disclosed herein. FIG. 3 also shows the cartridge retainer indicated by reference label 142 and the retainer screws indicated by reference label 146.

In FIG. 3, the printed flow rate settings include four (4) numeric indicators and hash marks 1, 2, 3, 4, as well as 12 intermediate hash marks. Three of the numeric indicators and hash marks for settings 2, 3, 4 are labeled 144*f*, 144*k* and 144*p*, respectively. (The numeric indicator and hash mark for setting 1 is not shown in FIG. 3.) In FIG. 3, eight (8) of the 12 intermediate hash marks are shown and unlabeled to reduce clutter. (Four (4) of the 12 intermediate hash that are between settings 1 and 2 are not shown in FIG. 3.) Consistent with that set forth above, the four (4) of the 12 intermediate hash marks between the settings for 2 and 3 corresponding to flow rates of 2.2, 2.4, 2.6. 2.8 and are calibrated to a precision of accuracy measured in tenths of a GPM; and the four (4) of the 12 intermediate hash marks between the settings for 3 and 4 corresponding to flow rates of 3.2, 3.4, 3.6. 3.8 and are also calibrated to a precision of accuracy measured in tenths of a GPM. In the embodiment in FIG. 3, all of the four (4) numeric indicators and hash marks 1, 2, 3, 4 and the 12 intermediate hash marks are calibrated to a precision of accuracy measured in tenths of a GPM.

In operation, the knob or handle 148 may have a position indicator 148*a* and may be configured to be moved or rotated to any continuous position on the flow rate indicator or scale 144 between the settings for 1 and 4 in response to rotational force applied by a user, where the relationship between the flow rate indicator or scale 144 of the valve member 112 and the position indicator 148*a* of the knob or handle 148 is based at least partly on calibrated flow characteristics of the balance or flow limiting valve 110. In operation, similar to that described above, the user can set the substantially exact desired flow rate in one operation by moving the knob or handle 148 to the desired position between the setting for 1 and 4 without consulting a printed flow curve or other form of a balance calculator to determine the desired exact flow rate of the balance or flow limiting valve 110.

Embodiments are also envisioned in which the flow rate indicator or scale 144 may include other types, kinds or number of settings, including for example, printed flow rate settings ranging from 0 to 4, or 1 to 5, etc. The scope of the invention is not intended to be limited to any particular type, kind or number of printed flow rate settings on the printed flow rate indicator or scale 144.

FIG. 4

Figure 4:
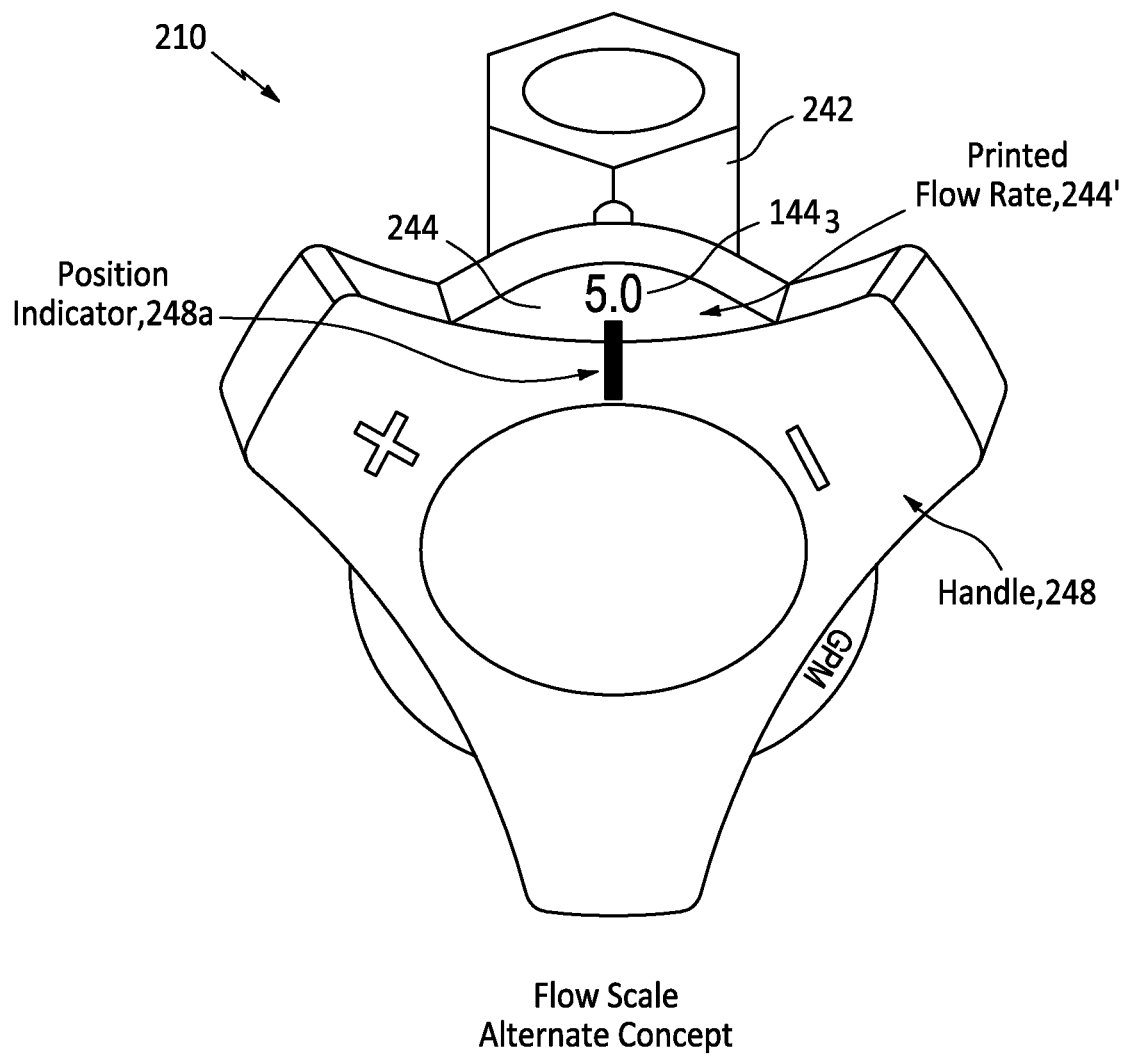
FIG. 4 shows apparatus in the form of part of a balancing valve having a flow rate scale field calibration, according to some embodiments of the present invention.

FIG. 4 shows apparatus generally indicated as 210 that forms part of a balancing valve having a flow rate scale field calibration, according to some embodiments of the present invention. In FIG. 4, corresponding parts or components to the parts or components shown in FIGS. 2*a* to 2*c* have corresponding reference labels plus 200.

In FIG. 4, the balancing valve 210 may include a valve body/member (not shown) having a cartridge retainer 242 arranged in relation to a knob or handle 248. The cartridge retainer 242 of the valve member (not shown) may be configured with a flow rate indicator or scale 244 containing settings each having a respective printed flow rate 244' calibrated in appropriate units of measure in volume per time increment within a predetermined degree of exactitude for settings, consistent with that disclosed herein.

In FIG. 4, one of the numeric indicators for setting 5 is shown and labeled 144*z*. (The numeric indicator and/or hash mark for other settings are not shown in FIG. 4.) In the embodiment in FIG. 4, all of the numeric indicators and hash marks and intermediate hash marks may be calibrated to a precision of accuracy measured, e.g., in tenths of a GPM.

In operation, the knob or handle 248 may have a position indicator 248*a* and be configured to be moved or rotated to any continuous position on the flow rate indicator or scale 244 between the highest and lowest settings in response to rotational force applied by a user, where the relationship between the flow rate indicator or scale 244 of the valve member and the position indicator 248*a* of the knob or handle 248 may be based at least partly on calibrated flow characteristics of the balance or flow limiting valve. In operation, similar to that described above, the user can set the substantially exact desired flow rate in one operation by moving the knob or handle 248 to the desired position between the highest and lowest settings without consulting the printed flow curve or other form of a balance calculator to determine the desired exact flow rate of the balance or flow limiting valve.

Embodiments are envisioned in which the flow rate indicator or scale 244 includes other types, kinds or number of printed flow rate settings, including for example, settings ranging from 0 to 5, or 1 to 5, etc. The scope of the invention is not intended to be limited to any particular type, kind or number of printed flow rate settings on the flow rate indicator or scale 244.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What we claim is:

1. An apparatus, Apparatus, including a balance or flow limiting valve, comprising:
    a valve body (12) configured with a flow rate indicator or scale (44) containing settings each having a printed flow rate calibrated in appropriate units of measure in volume per time increment between minimum and maximum flow rate positions; and
    a knob (48) having a position indicator (48*a*), the knob (48) being configured to be moved to any continuous position on the flow rate indicator or scale (44) between the minimum and maximum flow rate positions in response to force applied by a user,
    where the relationship between the flow rate indicator or scale (44) of the valve body (12) and the position indicator (48*a*) of the knob (48) is based at least partly on calibrated flow characteristics of the balance or flow limiting valve, so that the user can set a substantially exact desired flow rate in one operation by moving the knob (48) to a desired position between the minimum and maximum flow rate positions without consulting a printed flow curve or other form of a balance calculator to determine the desired exact flow rate of the balance or flow limiting valve, characterized in that the valve body (12) is configured with a first cavity (12a) to receive a combination of a seal (14a), ball (14b), a seat (14c), an O-ring (14d) and a ball retainer (14e), the valve body (12) is also formed with a second cavity coupled to the first cavity and configured to receive a combination of a pressure/temperature port stem (20) and a stem bonnet bushing (22), the balancing valve (10) includes an on/off handle (24) having a handle retaining portion (24a), the balancing valve (10) also includes a retaining ring (26) configured to attach to the pressure/temperature port stem (20), so as to couple together the pressure/temperature port stem (20), the stem bonnet bushing (22) and the handle retaining portion (24a), so that the on/off handle (24) can turn the pressure/temperature port stem (20), the valve body (12) is also formed with a third cavity configured to receive a pressure/temperature port (30), the valve body (12) is also formed with a fourth cavity that is coupled to the third cavity-, the fourth cavity is configured to receive a combination of a flow pressure regulating cartridge (40), a cartridge retainer (42) and the flow rate scale or indicator (44), wherein the knob (48) is configured in relation to the flow rate scale or indicator (44) and the cartridge retainer (42), the knob (48) is coupled to the flow pressure regulating cartridge (40), and the knob (48) is configured to be rotated in relation to the flow rate scale or indicator (44) and to turn the flow pressure regulating cartridge (40) so as to determine the flow rate of the balancing valve (10).

2. An apparatus according to claim 1, wherein the knob (48) is configured to rotate or to slide.

3. An apparatus according to claim 1, wherein the appropriate unit of measure is gallons per minute (GPM) or liters per hour (LPH), or other volumetric unit of measure for fluid volume per length of time.

4. An apparatus according to claim 1, wherein intermediate calibrated printed flow rate settings (1-5) between the minimum and maximum flow rate positions correspond to printed flow rates that are all calibrated to the same predetermined degree of exactitude, including about a tenth of a gallon per minute (GPM), between a minimum (MIN) printed flow rate and a maximum (MAX) printed flow rate.

5. An apparatus according to claim 4, wherein the predetermined degree of exactitude includes a predetermined degree of calibration that is measured in about a hundredth of a gallon per minute (GPM).

6. An apparatus according to claim 4, wherein the same predetermined degree of exactitude falls in a range of about a tenth to about a thousandth of a gallon per minute (GPM).

7. An apparatus according to claim 4, wherein the valve body/member (12) is configured so that flow is substantially linear and within about the same predetermined degree of exactitude when the knob (48) is moved to other settings between adjacent calibrated printed flow rate settings (1-5).

8. An apparatus according to claim 2, wherein the appropriate unit of measure is gallons per minute (GPM) or liters per hour (LPH), or other volumetric unit of measure for fluid volume per length of time.

9. An apparatus according to claim 2, wherein intermediate calibrated printed flow rate settings (1-5) between the minimum and maximum flow rate positions correspond to printed flow rates that are all calibrated to the same predetermined degree of exactitude, including about a tenth of a gallon per minute (GPM), between a minimum (MIN) printed flow rate and a maximum (MAX) printed flow rate.

10. An apparatus according to claim 3, wherein intermediate calibrated printed flow rate settings (1-5) between the minimum and maximum flow rate positions correspond to printed flow rates that are all calibrated to the same predetermined degree of exactitude, including about a tenth of a gallon per minute (GPM), between a minimum (MIN) printed flow rate and a maximum (MAX) printed flow rate.

* * * * *

UNITED STATES PATENT AND TRADEMARK OFFICE
CERTIFICATE OF CORRECTION

PATENT NO. : 11,274,767 B2
APPLICATION NO. : 17/245577
DATED : March 15, 2022
INVENTOR(S) : Stanley Paul Evans, Jr. et al.

Page 1 of 1

It is certified that error appears in the above-identified patent and that said Letters Patent is hereby corrected as shown below:

In the Claims

1. At Column 8, Line 45, Claim 1, Line 1, please delete the word "Apparatus", that appears after the phrase "An apparatus".

Signed and Sealed this
Twenty-eighth Day of November, 2023

Katherine Kelly Vidal
*Director of the United States Patent and Trademark Office*